United States Patent
Vermes et al.

[11] Patent Number: 5,273,650
[45] Date of Patent: Dec. 28, 1993

[54] CERAMIC FILTER

[75] Inventors: Sheldon A. Vermes, Shorewood; David M. Botts, Spring Park, both of Minn.

[73] Assignee: WTC Industries, Inc., Plymouth, Minn.

[21] Appl. No.: 992,523

[22] Filed: Dec. 17, 1992

[51] Int. Cl.$^5$ .................... B01D 27/14; C04B 35/00
[52] U.S. Cl. .................... 210/264; 210/282; 210/284; 210/315; 210/497.2; 210/510.1; 55/523
[58] Field of Search ............ 210/263, 264, 284, 282, 210/510.1, 314, 315, 317, 323.2, 337, 342, 437, 487, 488, 489, 492, 496, 497.01, 497.2; 55/523

[56] References Cited

U.S. PATENT DOCUMENTS

| | | | |
|---|---|---|---|
| 2,936,891 | 5/1960 | Kukowski et al. | 210/510.1 |
| 4,072,616 | 2/1978 | Rohlig | 210/510.1 |
| 4,107,045 | 8/1978 | Turetsky | 210/266 |
| 4,138,339 | 2/1979 | Turetsky | 210/337 |
| 4,166,793 | 9/1979 | Turetsky | 210/315 |
| 4,178,250 | 12/1979 | Turetsky | 210/315 |
| 4,352,735 | 10/1982 | Turetsky | 210/238 |
| 4,529,511 | 7/1985 | Breeden et al. | 210/94 |
| 4,681,677 | 7/1987 | Kuh et al. | 210/88 |
| 4,719,058 | 1/1988 | Komoda | 210/510.1 |
| 4,732,674 | 3/1988 | Tamura et al. | 210/266 |
| 4,769,144 | 9/1988 | Nohren, Jr. | 210/282 |
| 4,814,078 | 3/1989 | Stern et al. | 210/282 |
| 4,913,808 | 4/1990 | Haque | 210/93 |
| 4,995,976 | 2/1991 | Vermes et al. | 210/266 |
| 4,997,563 | 3/1991 | Jones | 210/510.1 |
| 5,017,286 | 5/1991 | Heiligman | 210/266 |
| 5,061,367 | 10/1991 | Hatch et al. | 210/137 |
| 5,064,534 | 11/1991 | Busch et al. | 210/510.1 |
| 5,126,044 | 6/1992 | Magnusson et al. | 210/282 |

Primary Examiner—Robert A. Dawson
Assistant Examiner—W. L. Walker
Attorney, Agent, or Firm—Kinney & Lange

[57] ABSTRACT

A water filter cartridge for use in a water filtration system comprises a generally cylindrical ceramic pre-filter having a chamber containing a purification resin. An exit cap having a porous disc therein is attached at a first end of the pre-filter. Water to be filtered passes radially through the pre-filter into the chamber. The water then passes through the purification resin and the porous disc and exits the water filter cartridge through an opening in the exit cap. The ceramic pre-filter can be cleaned when it begins to lose its effectiveness, enabling it to be reused.

13 Claims, 3 Drawing Sheets

CERAMIC FILTER

CROSS-REFERENCE TO RELATED APPLICATION

Reference is hereby made to an earlier filed co-pending application by Sheldon A. Vermes et al. entitled REPLACEABLE FILTER having Ser. No. 07/856,523 and filed on Mar. 24, 1992.

BACKGROUND OF THE INVENTION

The present invention relates to water filtration systems and, in particular, to a replaceable water filter cartridge for use in a variety of water filtration systems. The water filter cartridge is described as part of a water filtration system for purifying drinking water, but the invention is not restricted to such an application.

Many water filtration systems utilize a water filter cartridge having multiple stages of filtration that is capable of being replaced after the filtering media contained therein have been expended. This allows continued use of the original water filtration system by simply replacing the expended cartridge with a new cartridge.

A problem with such water filtration systems is that not all of the filtration stages of the water filter cartridge are expended at the same rate. More specifically, the effectiveness of the initial filter or pre-filter of such water filter cartridges tends to diminish well before the effectiveness of the commonly used bactericidal resin stage. The entire water filter cartridge must be disposed of when the pre-filter is no longer effective, resulting in the waste of still usable elements of the water filter cartridge.

SUMMARY OF THE INVENTION

The present invention provides a replaceable water filter cartridge that can be used in a water filtration system. The water filter cartridge has a reusable pre-filter that can be easily cleaned when it begins to lose its effectiveness.

The water filter cartridge of the present invention comprises a ceramic pre-filter having the general shape of a hollow cylinder having a central chamber that contains a halogenated purification resin, for example, the resin sold under the trademark PentaPure ®. The purification resin is contained within the pre-filter by an exit cap having a porous separator disc therein at a first end and an end cap at a second end. The porous separator disc is preferably one sold under the trademark Porex.

The water to be filtered flows from an inlet of the water filtration system into a space between a wall of a housing of the filtration system and the ceramic pre-filter. The water then flows radially inward through the pre-filter into the purification resin and longitudinally through the resin toward the porous separator disc. The water flows through the porous separator disc and exits the water filter cartridge through an opening in the exit cap, flowing through the appropriate outlet connections of the water filtration system. The outlet is isolated from the inlet so that raw water cannot mix with the treated (purified) water.

When the pre-filter loses its effectiveness, it can be easily accessed and removed from the water filtration system. The outer surface of the pre-filter can then be cleaned by scrubbing it with a brush to remove the debris and sediment from its pores and then placed back in the water filtration system. This arrangement eliminates the waste that accompanies replacing the entire water filter cartridge when only the pre-filter loses its effectiveness.

DETAILED DESCRIPTION OF THE PREFERRED EMBODIMENTS

Figure 1:
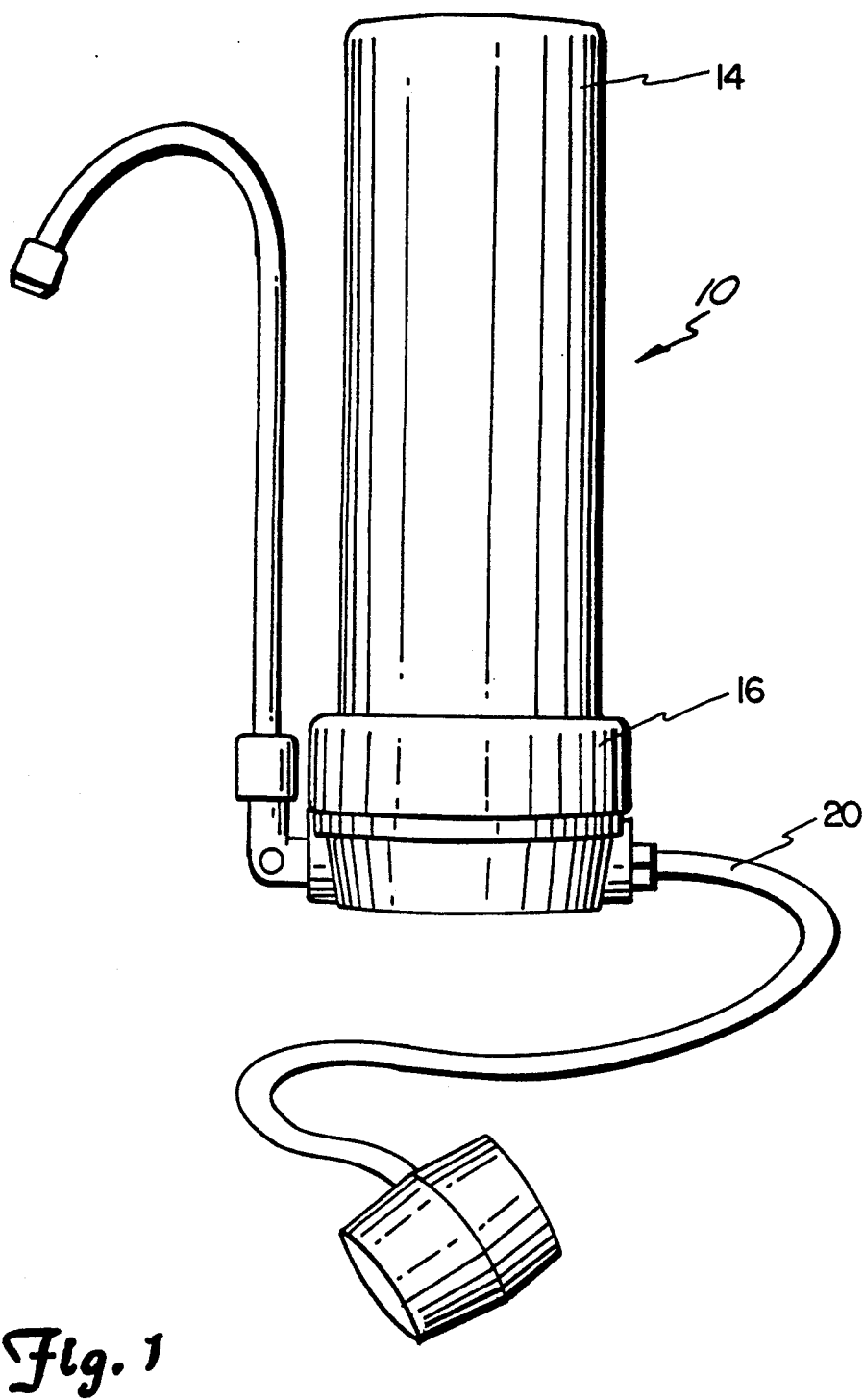
FIG. 1 is a perspective view of a water filtration system in which a water filter cartridge of the present invention is capable of being used.
Figure 2:
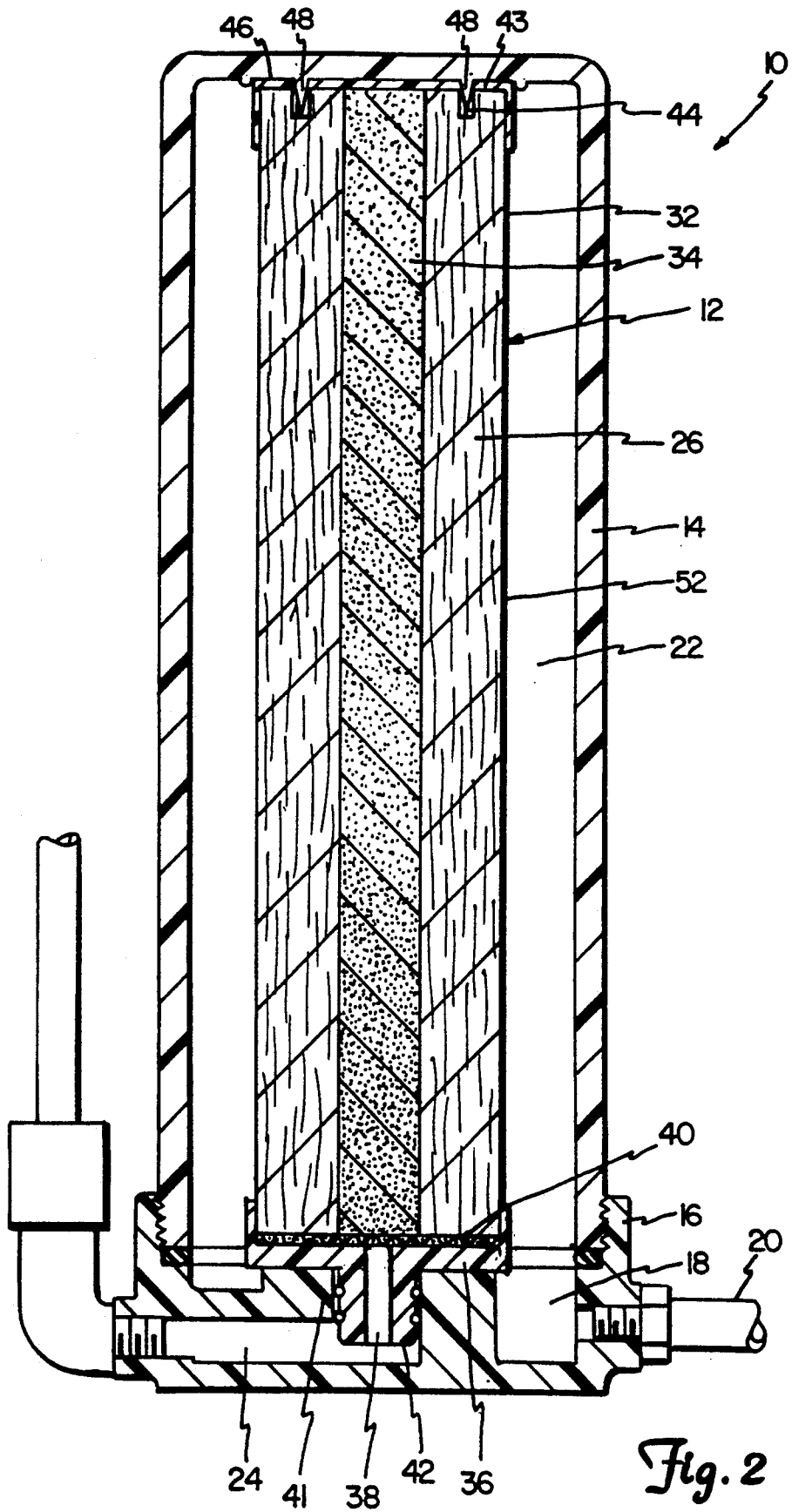
FIG. 2 is a sectional view of a water filtration system with a water filter cartridge of the present invention therein.

A water filtration system 10, in which a water filter cartridge 12 of the present invention is used, is shown in FIGS. 1 and 2. The water filter cartridge 12 is removable from the water filtration system 10 and therefore capable of being replaced.

The water filtration system 10 comprises a cover 14 surrounding the cartridge 12 that mounts on a removable cap 16. The cap 16 has a passageway 18 connectable to a line 20 leading to a faucet or other source of raw water. The raw water enters an annular space 22 between the cover 14 and the cartridge 12. The outlet end of the cartridge 12 sealingly opens to an outlet passageway 24 in the removable cap 16 which discharges purified water.

Figure 3:
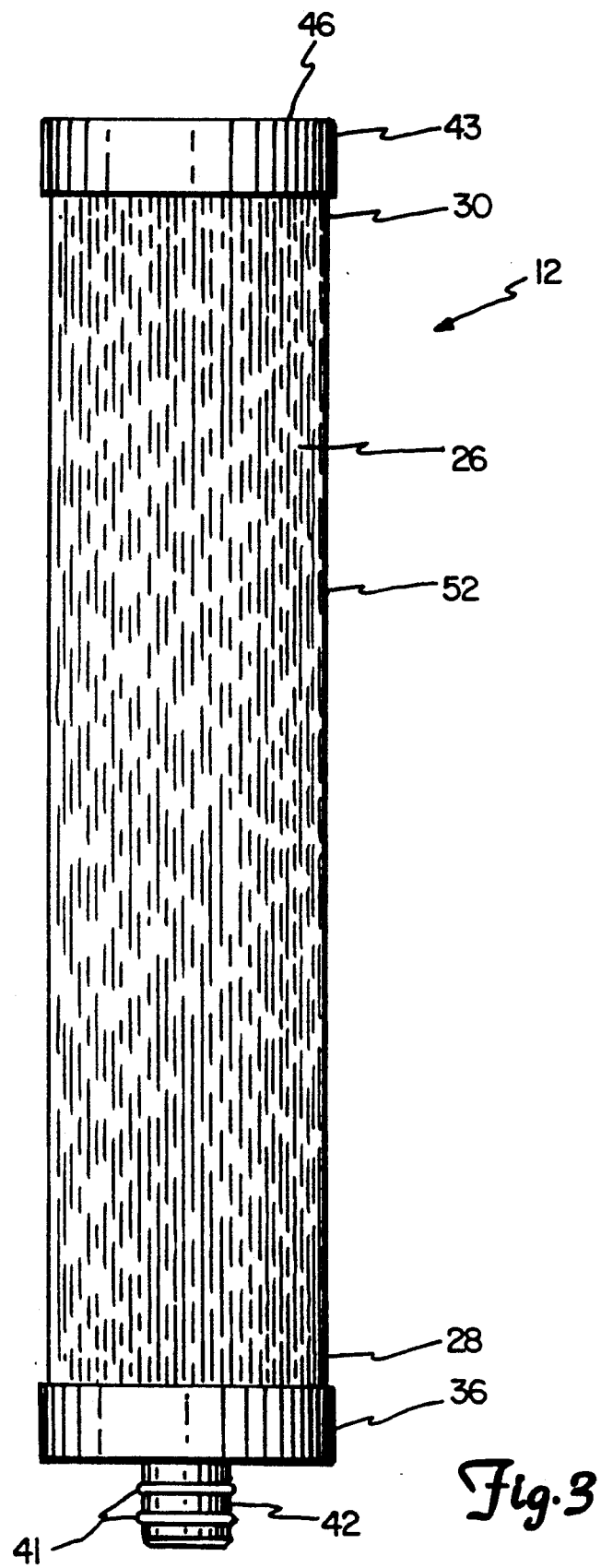
FIG. 3 is a perspective view of a water filter cartridge of the present invention.

The water filter cartridge 12, shown in FIGS. 2 and 3, comprises a ceramic pre-filter 26 having the general shape of a hollow cylinder open at both a first end 28 and a second end 30. The pre-filter 26 forms a chamber 32 which contains a halogenated purification resin 34, for example, the resin sold under the trademark PentaPure ®. The first end 28 of the pre-filter 26 is fitted with an exit cap 36 having a passageway 38 covered by a porous separator disc 40, such as a disc sold under the trademark Porex. The porous separator disc 40 contains the purification resin 34 within the chamber 32. The exit cap 36 is sealed with respect to the outlet passageway 24 in the removable cap 16 by two plastic O-rings 41 which are attached to an exterior surface of a protrusion 42 from the exit cap 36. The protrusion is inserted into the removable cap 16 and the O-rings 41 form a seal so that water discharged from the passageway 38 flows out the outlet passageway 24 of the removable cap 16.

An end cap 43 is fitted over the second end 30 of the pre-filter 26 to contain the purification resin 34 within the vessel 32. An annular groove 44 is located on an outer surface 46 of the end cap 43 and receives a plurality of teeth 48 located on an end wall 50 of the cover 14. The teeth 48 help hold the water filter cartridge 12 in place within the water filtration system 10. Both the exit cap 36 and the end cap 43 are attached to the pre-filter 26 through the use of an adhesive. The pre-filter 26 extends substantially the entire length of the cover 14 and thus efficiently utilizes available space in a given size housing.

The ceramic pre-filter 26 has micron-sized pores which filter sediment and other particles from the raw water. Because the ceramic pre-filter 26 is a surface filter, the filtered sediment collects on an exterior surface 52 of the pre-filter 26. When the ceramic pre-filter 26 becomes plugged so that it loses its effectiveness, it can be easily cleaned by removing the cover 14 of the water filtration system 10 and scrubbing the exterior surface 52 of the pre-filter 26 with a brush. When the ceramic pre-filter 26 is cleaned in this way, minute amounts of the pre-filter 26 are removed from the exterior surface 52 along with the filtered sediment. However, the pre-filter 26 will remain effective to filter sediment from the raw water until its radius is substantially diminished.

In operation, raw water enters the annular space 22, passes radially through the ceramic pre-filter 26, which removes sediment and other small particulate debris from the water, and enters the chamber 32. Once in the chamber 32, the water flows longitudinally through the purification resin 34 toward the first end 28 of the pre-filter 26. The water then flows through the porous separator disc 40 which retains the purification resin 34 in the chamber 32 while letting water flow through the passageway 38 in the exit cap 36. The purification resin 34 leaves an iodine residue in the filtered water that neutralizes any bacteria with which it comes into contact. Therefore, the water filter cartridge 12 of the present invention is ideal for use in purifying water in which the continued neutralization of bacteria and viruses is important.

Although the chamber 32 is described as containing only the halogenated purification resin 34, a filler rod can be placed in the chamber 32 so that it extends along the length of the chamber 32 and is surrounded by the purification resin 34. The filler rod serves the purpose of filling space in the chamber 32 to allow for the use of less purification resin 34.

The exit cap 36 and the end cap 43 are described as being attached to the ceramic pre-filter 26 through the use of an adhesive. However, both the exit and end caps 36,43 can be sonically welded to the pre-filter 26 as well. In addition, the exit cap 36 can be sealed with respect to the outlet passageway 24 in the removable cap 16 in a manner other than through the use of the O-rings 41.

The present invention provides a water filter cartridge 12 having a pre-filter 26 that can be cleaned and reused without replacing the water filter cartridge 12. This eliminates the waste involved with replacing the entire water filter cartridge 12 when only the pre-filter 26 becomes ineffective. The water filter cartridge 12 of the present invention may be used in a variety of water filtration systems and the entire cartridge 12 can be easily replaced when all of its usable elements become ineffective. Further, the raw water contacts the purification resin 34 after radially entering the chamber 32 so that a substantial area of interfacing between the ceramic pre-filter 26 and the purification resin 34 is available for water flow. The result is a compact, high capacity water filter.

Although the present invention has been described with reference to preferred embodiments, workers skilled in the art will recognize that changes may be made in form and detail without departing from the spirit and scope of the invention.

What is claimed is:

1. A water filter cartridge having at least two stages of treatment in series for use in a variety of water filtration systems, the water filter cartridge comprising:
   a ceramic pre-filter having the general shape of a cylinder and having a bore therein extending along the longitudinal axis of the ceramic pre-filter;
   purification resin contained within the bore; and
   containing means attached to the ceramic pre-filter for containing the purification resin within the bore.

2. The apparatus of claim 1 wherein the bore extends to a first end of the ceramic pre-filter.

3. The apparatus of claim 2 wherein the first end of the ceramic pre-filter is covered by the containing means.

4. The apparatus of claim 3 wherein the containing means comprises a porous disc.

5. The apparatus of claim 2 wherein the first end of the ceramic pre-filter is plugged by an exit cap having a passageway, and the passageway is covered by the containing means.

6. The apparatus of claim 5 wherein the containing means comprises a porous disc.

7. The apparatus of claim 2 wherein the water to be filtered passes in order through the ceramic pre-filter, the purification resin, and the first end of the ceramic pre-filter.

8. The apparatus of claim 5 wherein the water to be filtered passes in order through the ceramic pre-filter, the purification resin, and the passageway in the exit cap.

9. The apparatus of claim 1 wherein the purification resin surrounds a filler rod.

10. The apparatus of claim 1 and an outer housing providing a flow path for water from an exterior surface of the ceramic pre-filter to the purification resin.

11. The apparatus of claim 10 wherein the outer housing has a discharge passageway for receiving filtered water from the first end of the ceramic pre-filter.

12. A water filter cartridge having at least two stages of treatment in series for use in a variety of water filtration systems, the water filter cartridge comprising:
    a ceramic pre-filter having the general shape of a cylinder and having a bore therein extending along the longitudinal axis of the ceramic pre-filter to a first end of the ceramic pre-filter;
    purification resin contained within the bore; and
    containing means covering the first end of the ceramic pre-filter for containing the purification resin within the bore.

13. A water filter having at least two stages of treatment in series, the water filter comprising:
    a housing having an inlet and an outlet;
    a ceramic filter having the general shape of a cylinder contained within the housing and extending substantially the entire length of the housing, the cylinder having a bore therein extending along the longitudinal axis of the ceramic filter; and
    purification resin contained within the bore.

* * * * *